United States Patent [19]
Sikdar et al.

[11] Patent Number: 6,117,328
[45] Date of Patent: *Sep. 12, 2000

[54] ADSORBENT-FILLED MEMBRANES FOR PERVAPORATION

[75] Inventors: Subhas K. Sikdar, Cincinnati, Ohio; Wenchang Ji, Natick, Mass.; Sun-tak Wang, Cincinnati, Ohio

[73] Assignees: U.S. Environmental Protection Agency, Washington, D.C.; University of Cincinnati, Cincinnati, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/827,310

[22] Filed: Mar. 26, 1997

Related U.S. Application Data

[63] Continuation-in-part of application No. 08/502,873, Jul. 14, 1995, abandoned.

[51] Int. Cl.⁷ .................................................... B01D 61/36
[52] U.S. Cl. ...................... 210/640; 210/502.1; 210/653; 210/500.27; 96/4; 95/45; 95/50
[58] Field of Search ................................. 210/640, 502.1, 210/653, 500.27; 96/4; 95/45, 50

[56] References Cited

U.S. PATENT DOCUMENTS

| | | |
|---|---|---|
| 3,862,030 | 1/1975 | Goldberg . |
| 3,911,080 | 10/1975 | Mehl et al. . |
| 4,061,724 | 12/1977 | Grose et al. . |
| 4,243,701 | 1/1981 | Riley et al. . |
| 4,311,594 | 1/1982 | Perry ........................................ 210/640 |
| 4,430,226 | 2/1984 | Hegde et al. ........................... 210/638 |
| 4,735,193 | 4/1988 | Kulprathipanja et al. . |
| 4,740,219 | 4/1988 | Kulprathipanja et al. . |
| 4,806,245 | 2/1989 | Böddeker ................................ 210/640 |
| 4,970,085 | 11/1990 | Persson et al. . |
| 5,019,311 | 5/1991 | Koslow . |
| 5,127,925 | 7/1992 | Kulprathipanja et al. . |
| 5,147,550 | 9/1992 | Wijmans et al. . |
| 5,169,533 | 12/1992 | Baker et al. ........................... 210/640 |
| 5,279,742 | 1/1994 | Markell et al. . |
| 5,338,450 | 8/1994 | Maurer . |
| 5,429,743 | 7/1995 | Geus et al. . |
| 5,472,613 | 12/1995 | Schofield . |

FOREIGN PATENT DOCUMENTS

| | | |
|---|---|---|
| 0 254 758 | 2/1988 | European Pat. Off. . |
| 58-095524 | 6/1983 | Japan . |

OTHER PUBLICATIONS

Hennepe et al, "Zeolite–Filled Silicone Rubber Membranes: Part 1. Membrane Preparation and Pervaporation Results", *J. Membrane Science*, 35(1):39–53 (1987).

*Primary Examiner*—Ana Fortuna
*Attorney, Agent, or Firm*—Browdy and Neimark

[57] ABSTRACT

Pervaporation membranes are used for removing volatile organic compounds from wastewaters. These pervaporation membranes are prepared by dispersing at least one hydrophobic adsorbent such as activated carbon uniformly into a polymer matrix.

8 Claims, 16 Drawing Sheets

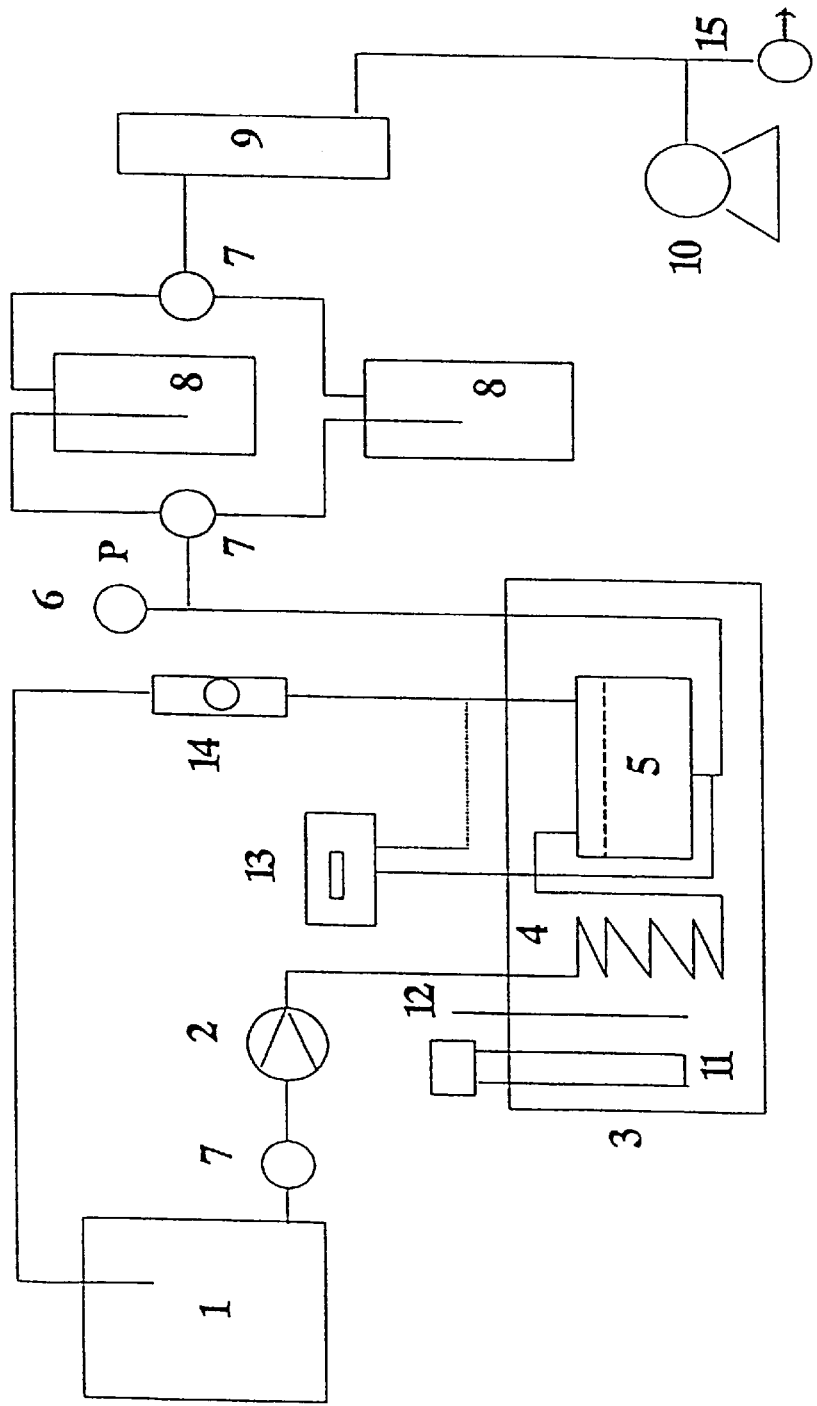
Fig.16 Test unit for pervaporation process. 1. feed tank, 2. feed pump, 3. isothermal bath, 4. heating coil, 5. membrane cell, 6. pressure meter, 7. valve, 8. cold trap, 9. dryer, 10. vacuum pump, 11. immersion circulator-heater-controller, 12. thermocouple, 13. thermometer, 14. flowmeter, 15. needle valve

ADSORBENT-FILLED MEMBRANES FOR PERVAPORATION

The present application is a continuation in part of application Ser. No. 08/502,873, filed Jul. 14, 1995, abandoned, the entire contents of which are hereby incorporated by reference.

FIELD OF THE INVENTION

The present invention is directed to adsorbent-filled membranes for use in pervaporation. More particularly, the present invention is directed to adsorbent-filled membranes for removing volatile organic compounds from wastewater by pervaporation.

BACKGROUND OF THE INVENTION

Pervaporation is a method for removing, concentrating and recovering substances from a liquid by sorbing in a pervaporation membrane the component to be removed, followed by diffusion and evaporation of the component or components to the other side of the membrane followed by condensation. Pervaporation as a method of separation requires the use of non-porous membranes (sometimes referred to as dense membranes), because pervaporation works on a solution-dissolution-evaporation (that is, phase change) mechanism rather than on pore-diffusion as in conventional porous membranes. Pervaporation membranes permit very high separation efficiency for volatile organic compounds, e.g., separation factors of several thousands using pervaporation membranes rather than conventional porous membranes. This high separation efficiency cannot be obtained by porous membranes, through which all molecules diffuse based upon size and shape. The size and shape of molecules to be separated are irrelevant for pervaporation, which means that porous membranes which are suitable for separation by size or molecular shape are not necessarily suitable, and may be particularly unsuitable, for pervaporation processes.

In other words, pervaporation is based upon solution-dissolution-evaporation (i.e., phase change) mechanism, while porous membrane separation is based solely upon the size and shape of molecules involving no phase changes of the components. Porous membranes retain components on the membrane because the molecules of the components are either too large or are the wrong shape to diffuse through the membrane.

Since it is a membrane process, pervaporation is a continuous, non-equilibrium process. Pervaporation is particularly useful for removing and concentrating volatile organic compounds from wastewater. Water has a molecular weight significantly lower than that of chlorinated hydrocarbons, and "pervaporates" two to three orders of magnitude more slowly than chlorinated hydrocarbons through conventional hydrophobic pervaporation membranes. This could not possibly happen in ultrafiltration or microfiltration, as these processes are solely dependent upon discrimination by molecular size and shape.

The major contaminants in industrial wastewater and ground water are volatile organic compounds, particularly chlorinated and aromatic hydrocarbons. Conventional separation technologies such as distillation and liquid—liquid extraction are not applicable because they are prohibitively expensive at the low concentrations of volatile organic compounds generally encountered. Currently, carbon adsorption and air stripping are widely used to remove volatile organic compounds. Neither of these methods can recover volatile organic compounds; the volatile organic compounds are merely transferred from one medium to the next for eventual destruction.

Problems with carbon adsorption are:
(i) Gradual loss of adsorbent capacity with time;
(ii) Spent beds become hazardous wastes;
(iii) There is a possibility of explosion and fire;
(iv) Regeneration of the bed is energy intensive; and
(v) The volatile organic compounds must be further handled upon regeneration.

Air stripping merely transfers the volatile organic compounds from aqueous wastes to air in which the volatile organic compounds are diluted and require incineration or other expensive thermal methods for oxidative destruction of the volatile organic compounds.

Pervaporation is essentially a recovery process all in one unit. In most instances, pervaporation is deemed to be cheaper, especially where the recovered volatile organic compounds can be reused, in which case it is also more environmentally friendly.

As noted above, volatile organic compounds can be recovered from water or oil by sorption onto hydrophobic adsorbents such as activated carbon [1–2]. Activated carbon has been used to remove chlorinated hydrocarbons from spilled industrial solvents and gasoline constituents from leaking underground storage tanks, to polish effluents from biological treatments processes, as well as to treat air emissions from air-stripping of groundwater and soil vacuum extraction [3]. These processes operate on adsorption-regeneration cycles.

It has been demonstrated that carbonaceous adsorbents made by polymer pyrolysis can efficiently remove chlorinated hydrocarbons present in small amounts in water. However, these processes use discrete solid phase adsorbent pellets, and operate semi-continuously on adsorption-regeneration cycles. The need for frequent regenerations makes carbon adsorption economically unattractive for high concentrations of volatile organic compounds.

Additionally, activated carbon adsorption suffers from the following disadvantages for control of volatile organic compounds:

Two adsorbent beds are required, one for adsorption and one for regeneration, as when one bed is on an adsorption cycle, the other is on a desorption cycle and vice versa;

Steam stripping is routinely employed for regeneration of activated carbon. The energy costs for generating steam are high, and when this steam condenses, it gives rise to a waste water problem;

Activated carbon beds cannot handle large fluctuations in concentrations of volatile organic compounds because of slow kinetics;

The flammability of activated carbon limits the practical adsorption temperature of volatile organic compounds to 120°. Hence, volatile organic compounds with boiling points over 150° cannot be effectively desorbed.

The operating life of activated carbon is also limited, since it may lose up to 10% of its activity each time it is regenerated.

In pervaporation, sorption and diffusion determine the separation. In order to combine the advantages of high sorption capacity of microporous hydrophobic adsorbents with the continuous operation of membrane separation processes, a new type of membrane [5] was developed. These heterogeneous membranes consisted of a polymeric phase and adsorbent particles uniformly dispersed into the polymeric phase. For instance, the performance of a silicone rubber membrane for separating alcohol from aqueous solution was enhanced by adding to the membrane an alcohol-selective molecular sieve such as hydrophobic zeolite [5]. Both selectivity and flux were improved according to the results obtained by Hennepe et al. [5]. Hydrophilic zeolite was used to facilitate water transport and to increase the selectivity of water over ethanol in separating ethanol-water azeotrope [6]. Higher oxygen permeability and $O_2/N_2$ selectivities were obtained for silicalite (a form of zeolite) filled membranes than for those without silicalite [7]. Duval et al. [8] studied the effect of adding carbon molecular sieves and various kinds of zeolites on the gas separation properties of polymeric membranes. They found that zeolites such as silicalite-1, 13X and KY improved the separation of $CO_2/CH_4$ mixtures by rubber polymers. On the other hand, zeolite 5A led to a decrease in permeability and unchanged selectivity. Carbon molecular sieves did not improve the separation performance, or only to a very small extent.

Most of the above-described studies were limited to molecular sieve materials such as zeolites, and to the separation of ethanol-water mixtures by pervaporation or gas separation. However, in these studies the ethanol was present in relatively high concentrations. The "absolute ethanol" obtained has about 0.1% water, which is higher than the concentration of volatile organic compounds in water to be treated. Moreover, pervaporation has heretofore proved to be impractical for use in treating wastewater because most of the reported studies were directed to elucidating the pervaporation operation, and were limited to one-component systems, such as toluene in water. Practical problems, however, invariably involve multi-component systems containing sometimes both polar and non-polar volatile organic compounds.

Strategies for recovery of these multi-component systems can be complex, especially if the volatile organic compounds are to be separated into the pure components for reuse.

Adsorbent-filled membranes have been used for gas enrichment separation, cf. Kulprathipanja et al., U.S. Pat. Nos. 5,127,925 and 4,740,219. Kulprathipanja et al. use adsorbent-filled membranes for separation of oxygen from nitrogen, whereby diffusion appears to play an important role. The gases separated are non-polar atmospheric gases. The adsorbents Kulprathipanja et al. use are zeolite, a crystalline aluminosilicate, activated carbon, inorganic oxides, and ion exchange resin, on a porous polymer which may be polysilicone or cellulose acetate. Moreover, zeolites are essentially cages where the molecule of interest is of a similar size to the cage (pore); the molecule of interest is trapped and later expelled. This is, in essence, a shape-selective adsorbent. Specific gases can be somewhat concentrated by this method, e.g., oxygen in air from 21% to 35%, but not much more. The distinct difference between this process and the pervaporation process is that, unlike pervaporation, which involves volatile compounds, gas separation does not involve a phase change.

Schofield et al., U.S. Pat. No. 5,472,613 discloses using adsorbent-filled membranes for adsorption processes. This is strictly a sorption process, and there is no transmembrane flow involved. Schofield et al. limit the processes to batch-wise adsorption in an equilibrium process, using a thick film (0.1–5 mm) and unspecified solid adsorbents.

Goldberg et al., U.S. Pat. No. 3,862,030, described preparation of microporous membranes by adding an inorganic filler such as silica hydrogel or precipitated hydrated silica, or any other carrier or substrate for volatile matter, into a polymeric matrix. The membranes made by Goldberg et al. are microporous membranes used for filtration, i.e., removal of microscopic or ultrafine particles from the medium in which they are suspended. These membranes thus depend upon pore size for separation, as there are networks of micro-voids or pores formed in the resinous matrix.

Persson et al., U.S. Pat. No. 4,970,085, disclose removing volatiles from an aqueous stream such as a juice. However, the Persson et al. process is limited to use of a solid adsorbent; there is no support such as membrane which sorbs the component to be removed. This process is a sorption process, no membrane is involved, and there is no suggestion of removing and/or recovering volatile organic compounds.

SUMMARY OF THE INVENTION

It is an object of the present invention to overcome the aforementioned deficiencies of the prior art.

It is an object of the present invention to provide means for treating wastewater.

It is another object of the present invention to provide pervaporation membranes for treating wastewater.

It is a further object of the present invention to provide adsorbent-filled pervaporation membranes for treating wastewater to remove volatile organic compounds.

It is yet another object of the present invention to recover volatile organic compounds from wastewater.

According to the present invention, pervaporation membranes are provided for pervaporation of volatile organic compounds from water. These pervaporation membranes comprise a polymeric membrane filled with at least one hydrophobic adsorbent.

To remove volatile organic compounds from wastewater, the contaminated wastewater is pumped through a pervaporation module in which are installed adsorbent-filled pervaporation membranes. A reduced partial vapor pressure is applied at the permeate side, which reduced partial vapor pressure is generated either by a vacuum or a carrier gas. The volatile organic compounds, even when present at extremely low concentrations, can be concentrated by orders of magnitude at the permeate side compared to the feed, and recovered by condensation.

The pervaporation membranes of the present invention are prepared by dispersing a hydrophobic adsorbent (filler) such as activated carbon uniformly into a polymer matrix and casting membranes from the dispersion. Any hydrophobic adsorbent can be used in pervaporation membranes according to the present invention, as long as the hydrophobic adsorbent has a very high surface area to permit adsorption of the maximum amount of volatile organic compounds from water.

BRIEF DESCRIPTION OF THE DRAWINGS

FIG. 16 is a schematic of a test unit for a pervaporation process.

DETAILED DESCRIPTION OF THE INVENTION

Figure 1:
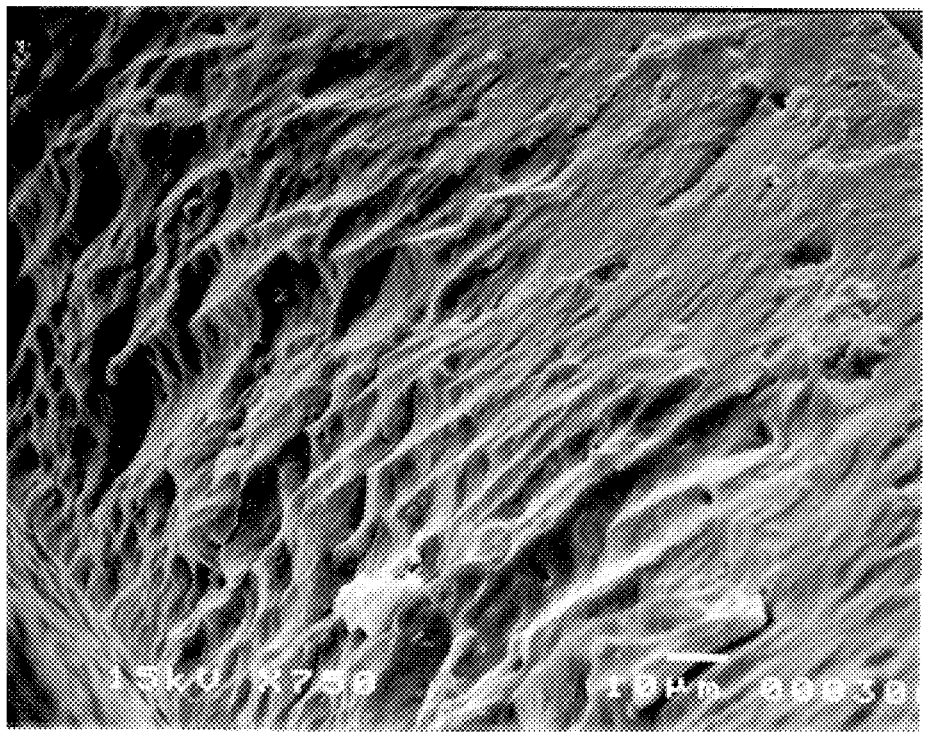
FIG. 1 shows SEM photographs of a PEBA pervaporation membranes filled with 10 wt % of activated carbon, in cross section.

The two most important parameters in determining effective separation for removal and recovery of volatile organic compounds from water by pervaporation are membrane selectivity and permeability. Pervaporation membranes according to the present invention provide enhanced removal of volatile organic compounds from wastewaters. The membranes of the present invention comprise a hydrophobic adsorbent (filler) uniformly dispersed in a polymeric matrix. The presence of the adsorbent in the membrane increased both the permeability of the volatile organic compounds and the selectivity with respect to water in the pervaporation process. Modification of membrane morphology by incorporating a hydrophobic filler such as activated carbon offers a simple and promising way of increasing the separation efficiency of the pervaporation membranes. This modification can be implemented commercially very easily.

It is not possible to predict pervaporation from sorption. The pervaporation membrane requires sorption and then simultaneous diffusion through the non-porous membrane. Adding a sorbent gives two phases: one involving the membrane and one involving the sorbent. In essence, there is discontinuous, dual sorption, with gases and solvents sorbed differently by the two phases.

If the pervaporation membrane is loaded with sorbent, there are two possibilities:

a. The more there is of high surface area sorbent, the more convoluted is the diffusion path through the membrane. This increases the resistance of the membrane, thus lowering the flux through the membrane.

b. If there is so much adsorption of the suspended phase that the sorbent concentration in the membrane is huge, there is a driving force that is much higher than the resistance due to the convoluted diffusion pathways.

Therefore, it is not possible to predict which of the above behaviors overwhelms the other.

In general, the lower molecular weight organic compounds are the more volatile compounds which are to be removed from wastewater. Of course, the specific compounds to be removed will vary, depending upon the source of the pollution. However, the volatile organic compounds that can be removed by the process and membrane of the present invention include, but are not limited to, N,N-dimethylnitrosamine; chloroethane; benzoic acid; EDTA; benzene; cytosine; acrolein; methylene chloride; acrylonitrile; 1,1-dichloroethane; 1,1,1-trichloroethane; chloroform; 1,2-trans-dichloroethylene; 1,2-dichloroethane; diphenylamine; benzothiazole; 1,4-dichlorobenzene; p-chloro-m-cresol; 1,2-dichlorobenzene; naphthalene; 1,1-diphenylhydrazine; p-nitroaniline; 4-bromophenyl phenyl ether; 2,6-dinitrotoluene; pentachlorophenol; 2-naphthylamine; 2-chloroethyl vinyl ether; dibromochloromethane; 1,1-dichloroethylene; 5-fluorouracil; trichlorofluoromethane; 1,1,2-trichloroethane; 1,2-dichloropropene; 1,1,2,2-tetrachloroethane; benzo[ghi]perylene; uracil; bis(2-chloroethoxy)methane; carbon tetrachloride; bromoform; phenol; bis(2-chloroisopropyl)ether; N-nitrosodi-n-propylamine; 5-chlorouracil; toluene; thymine; trichloroethylene; isophorone; 2,4-dinitrophenol; benzo[a]pyrene; 5-bromouracil; o-anisidine; tetrachloroethylene; 2-chlorophenol; ethylbenzene; 1,2-dibromo-3-chloropropane; 3,4-benzofluoroanthrene; nitrobenzene; dibenzo[a,h]anthracene; adenine; 1,2,3,4-tetrahydronaphthalene; acetophenone; 4-nitrophenol; 2,4-dimethylphenol; p-xylene; chlorobenzene; hexachloroethane; dimethylphthalate.

The pervaporation membranes material can be readily chosen by one skilled in the art to be non-reactive with the particular volatile compound or compounds to be removed. Similarly, the adsorbent can readily be chosen so as not to preferentially adsorb water, but to adsorb the particular volatile compound or compounds to be removed. These choices can readily be made by one skilled in this art without undue experimentation.

The pervaporation membranes of the present invention are very easy and convenient to use, and concentrate the volatile organic compounds by more than 100%, and in some cases as much as two to three thousand-fold. Once the volatile organic compounds have been removed from wastewater using the pervaporation membranes of the present invention, the volatile organic compound are so concentrated that the volatile organic compounds can be reused.

The pervaporation membranes of the present invention can be used to treat wastewater for removal of volatile organic compounds at room temperature, and the operation is a one-step operation. With the greater volume reduction of the volatile organic compounds, at least 100% improvement over prior membranes is obtained. As noted above, the volatile organic compounds are recovered at such a high concentration that they can be readily reused.

The pervaporation membranes used in the present invention are made of polymers, the chemical structure of which ranges from simple hydrocarbons such as polyethylene or polypropylene, to polar structures like polyamides, or ionic structures in which cations or anions are attached to the backbone. The choice of polymer for the membrane is dictated by the types of volatile organic compounds which are to be removed from the wastewater.

More specifically, flat sheet membranes can be used, made of polymers filled with a hydrophobic adsorbent.

Examples of such polymers include poly(dimethylsiloxane), polyether-block-polyamides, and silicon-polycarbonate copolymer membranes.

The pervaporation membranes of the present invention can be used for pervaporation processes in the form of flat sheets, either homogeneous or composite membranes, or spiral wound or hollow fiber composite membranes.

The hydrophobic adsorbent, which aids in removing the volatile organic compounds from wastewater, may be present in the pervaporation membrane in amounts ranging from about 1% to about 25% by weight. Among the hydrophobic adsorbents that may be used, in addition to activated carbon, are hydrophobic adsorbents with a very large surface area, such as carbonaceous adsorbents made by polymer pyrolysis, hydrophobic inorganic adsorbents having a very high surface area, such as hydrophobic zeolite-based adsorbents, hydrophobic molecular sieves, hydrophobic polymer resin adsorbents, and the like. For the purpose of the present invention, an adsorbent which has a high surface area is one having a surface area of more than 400 $m^2/g$, and preferably a surface area of at least 400 $m^2/g$.

Among the polymers that can be used for the pervaporation membrane matrix are rubbery polymers and copolymers such as polydimethyl siloxane, poly(1-trimethylsilyl-1-propyne), polyurethanes, polybutadiene polyether block amide polymers (PEBA), silicone/polycarbonate polymers, styrene butadiene rubber, nitrile butadiene rubber, and ethene-propene terpolymer.

Two or more adsorbents can be mixed and included in the pervaporation membrane in any desired ratio of adsorbents.

The following specific examples will further illustrate the principles of the present invention. These examples, however, are for purposes of illustration, and not for limitation.

Pervaporation membranes according to the present invention were prepared by dispersing an adsorbent into a polymer matrix, and casting the pervaporation membrane composition onto a support in a conventional manner. A typical pervaporation membrane was prepared by dispersing activated carbon hydrophobic adsorbent into a polymer matrix of polyether-block-polyamide (PEBA) polymer. The presence of activated carbon in the PEBA membrane increased both the permeability of volatile organic compounds and selectivity in the pervaporation process as compared to homogeneous PEBA membranes with no adsorbent present.

EXAMPLE 1

Adsorbents and Polymers

The microporous adsorbents used in this study were powdered activated carbon WPX (Calgon Carbon Corporation, PA) and Ambersorb 1500 carbonaceous adsorbents (Rohm and Haas Company, PA). WPX is produced from reactivated granular coal-based carbon. WPX has a high iodine number, which allows for the adsorption of a wide range of organic compounds. Ambersorb 1500 is made by pyrolysis of a highly sulfonated styrene/divinylbenzene macroreticular ion exchange resin. During pyrolysis, microporosity and mesoporosity increase while the macroreticular structure remains intact [12].

Pore volume, pore size distribution and BET surface area of both adsorbents were determined by nitrogen adsorption porosimetry (Micrometrics, ASAP 2000). The nitrogen adsorption method can measure the pore volume of pores up to 300 nm. The bulk density of the adsorbents was measured by mercury porosimetry. The results are listed in Table 1.

TABLE 1

Physical Properties of Activated Carbon (AC) and Ambersorb 1500 (CA)

| Adsorbent | Surface Area[a] ($m^2/g$) | Density[b] (g/cm3) | Pore Vol. ($cm^3/g$) | |
|---|---|---|---|---|
| | | | <2.0 $nm^a$ | 2.0–3.0 $nm^a$ |
| AC | 904 | 0.7996 | 0.23 | 0.20 |
| CA | 1184 | 0.8530 | 0.39 | 0.45 |

[a]data from $N_2$ adsorption experiments
[b]data from Hg porosity

As can be seen from Table 1, both activated carbon and Ambersorb 1500 have a high surface area, over 900 $m^2$ per gram. Ambersorb 1500 had a more porous structure than activated carbon WPX. For example, the micropore volume of Ambersorb 1500 is almost twice as high as that of activated carbon.

Polyether-block-polyamide (PEBA) (AutoChem, NJ) was used as the polymer phase in the membrane systems described in the present experiments, since the potential application of this membrane for removing volatile organic compounds has been amply demonstrated (4, 13, 14).

Membrane Preparation

The adsorbent-filled PEBA pervaporation membranes were prepared by adding adsorbents to a 10–15 wt % PEBA solution in 1-butanol and 1-propanol in a 4:1 volume ratio and casting the suspension on a glass plate by a cast knife (Paul N. Gardner Co.). The pervaporation membrane thus formed was first dried overnight at room temperature (23° C.) and then dried in a vacuum oven (50° C.) for at least 24 hours to remove any residual solvent. Fine adsorbent particles were obtained by grinding the commercialized materials in a mill (Lartone, Inc., Seattle, Wash.). Only the fraction of particles of either adsorbent that passed through a 400 mesh U.S. Sieve Series screen size (38μ) was used in preparing the pervaporation membranes. PEBA (AutoChem, NJ) was dissolved in a solvent made of 1-butanol and 1-propanol in 4:1 volume ratio. The solution was kept warm overnight to eliminate air bubbles. During drying the glass plate was covered by a funnel to minimize air turbulence which could cause formation of pin holes and surface waves and make the membrane nonuniform. After drying, the membrane was removed from the glass plate by a roller. Pervaporation membranes having various thickness (100–200μ) were prepared by this method. Homogeneous PEBA membranes were prepared in a similar way for comparison.

A scanning electron microscope was used to check the homogeneity of the particle dispersion. As shown in FIG. 1, all of the adsorbent particles were well dispersed in the polymer phase of the pervaporation membranes.

EXAMPLE 2

All of the membranes prepared for use in these experiments were characterized by permeation, sorption and desorption experiments. The apparatus for permeation experiments was described in Ji et al. [4]. The permeation fluxes were measured and used to calculate the membrane intrinsic permeability which provides a common measure for comparing performance of different membranes.

EXAMPLE 3

Trichloroethane and Water permeation through Adsorbent-filled PEBA Pervaporation Membranes.

Figure 4:
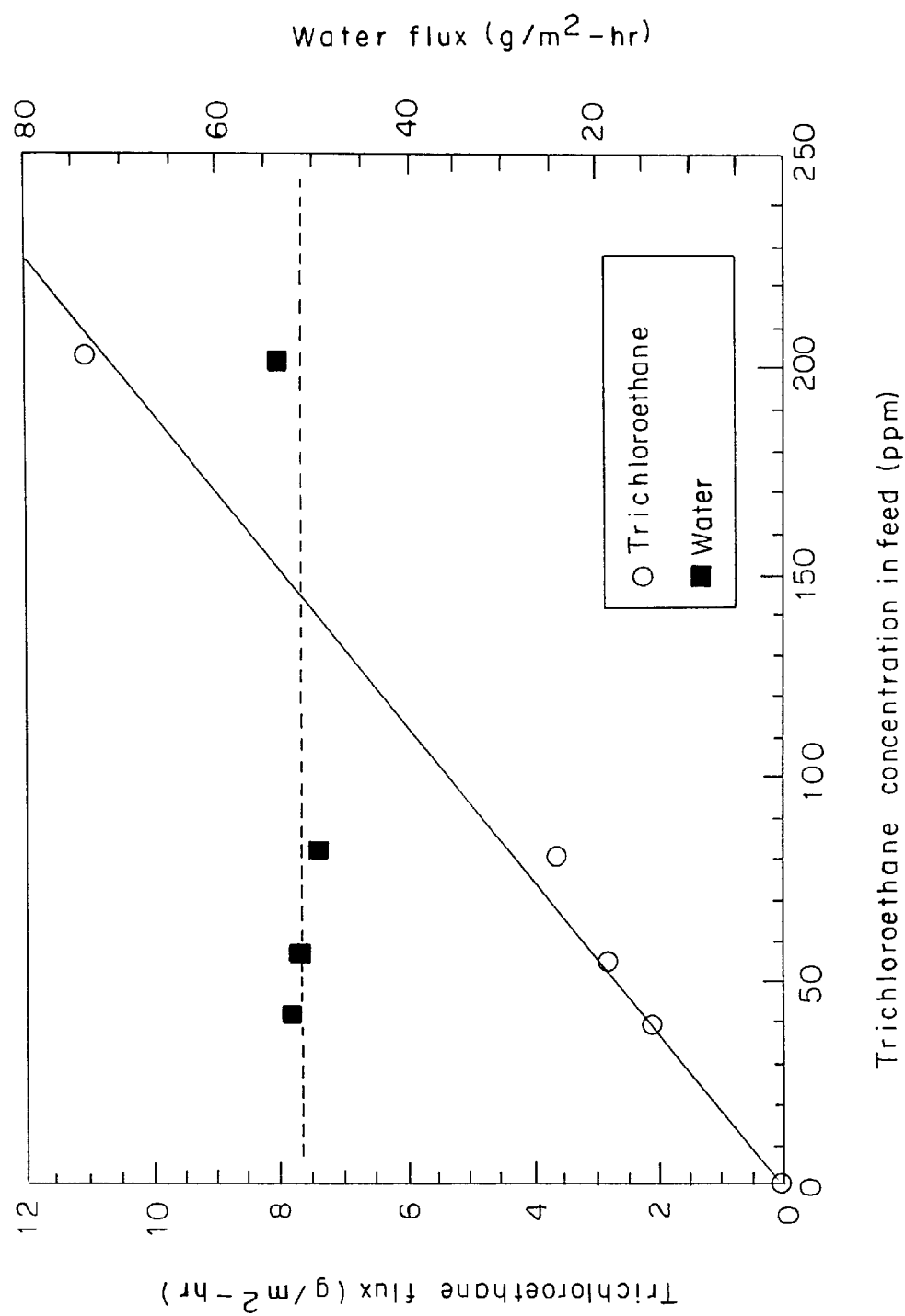
FIG. 4 shows the trichloroethane and water fluxes vs. feed concentration for PEBA pervaporation membranes filled with 5 weight % of activated carbon at 30° C.
Figure 5:
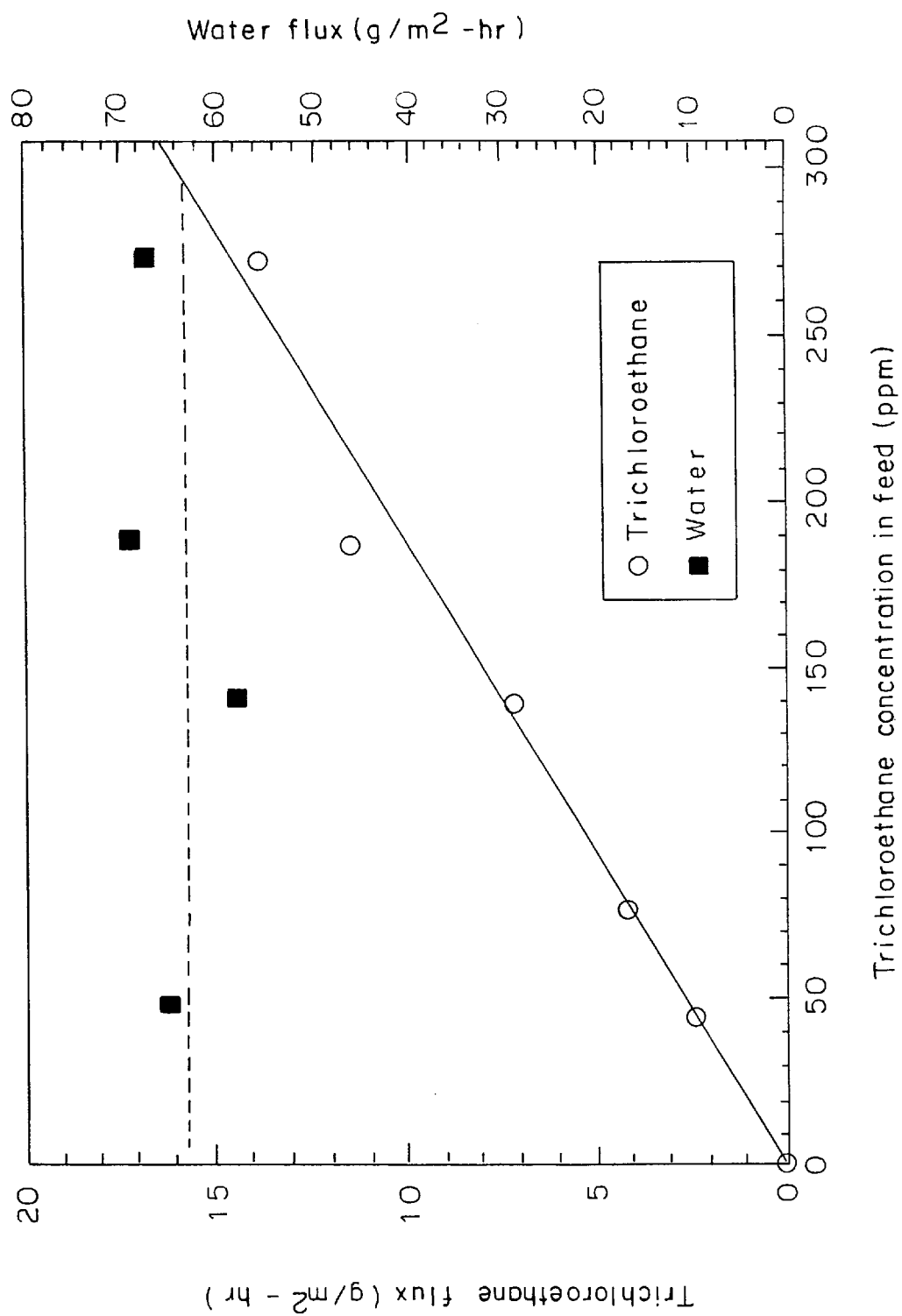
FIG. 5 shows trichloroethane and water fluxes vs. feed concentration of PEBA pervaporation membranes filled with 5 weight of carbonaceous adsorbent at 30° C.
Figure 6:
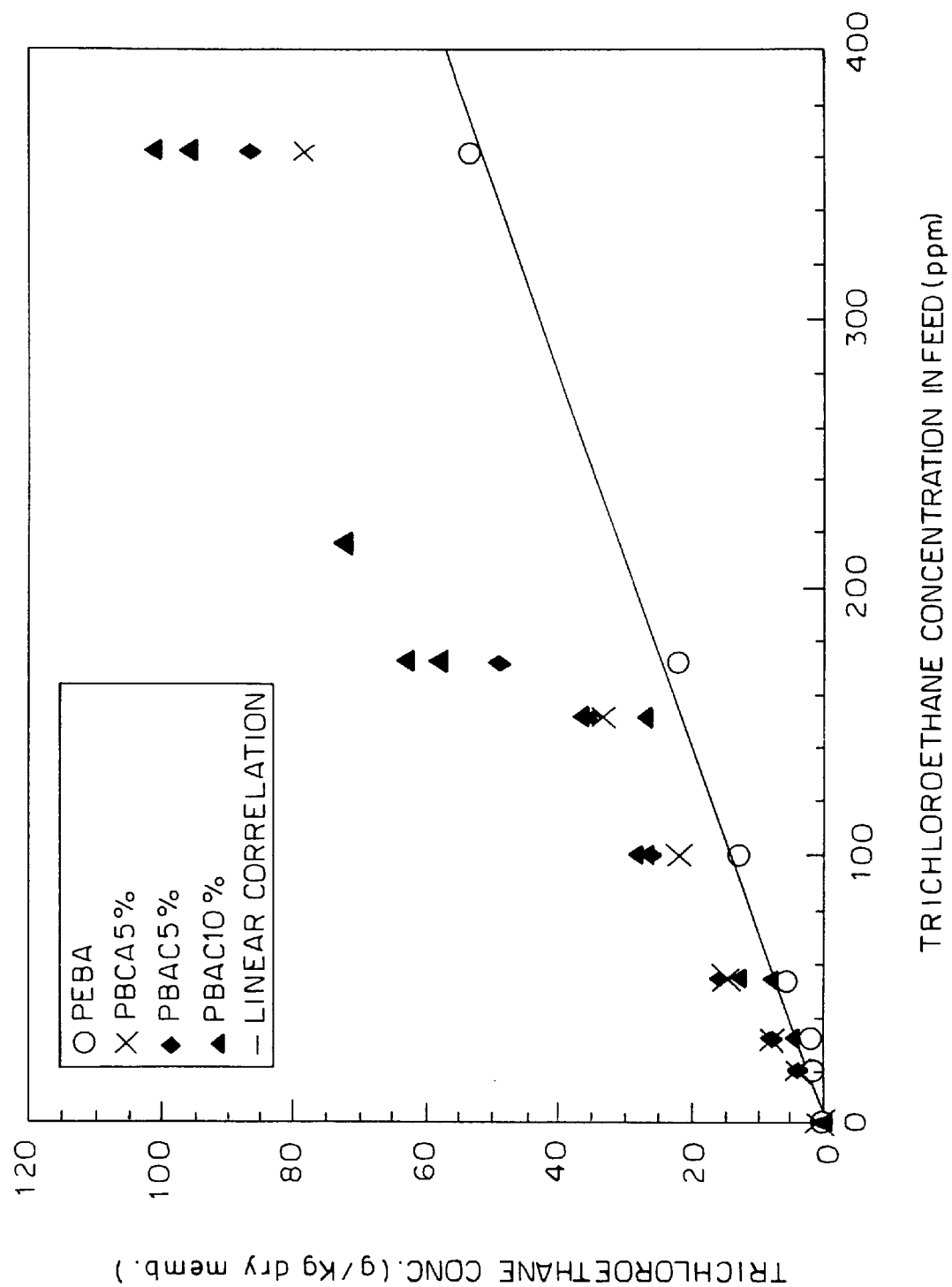
FIG. 6 shows sorption isotherms of trichloroethane from dilute aqueous solution into PEBA and its adsorbent-filled pervaporation membranes at 30° C.
Figure 7:
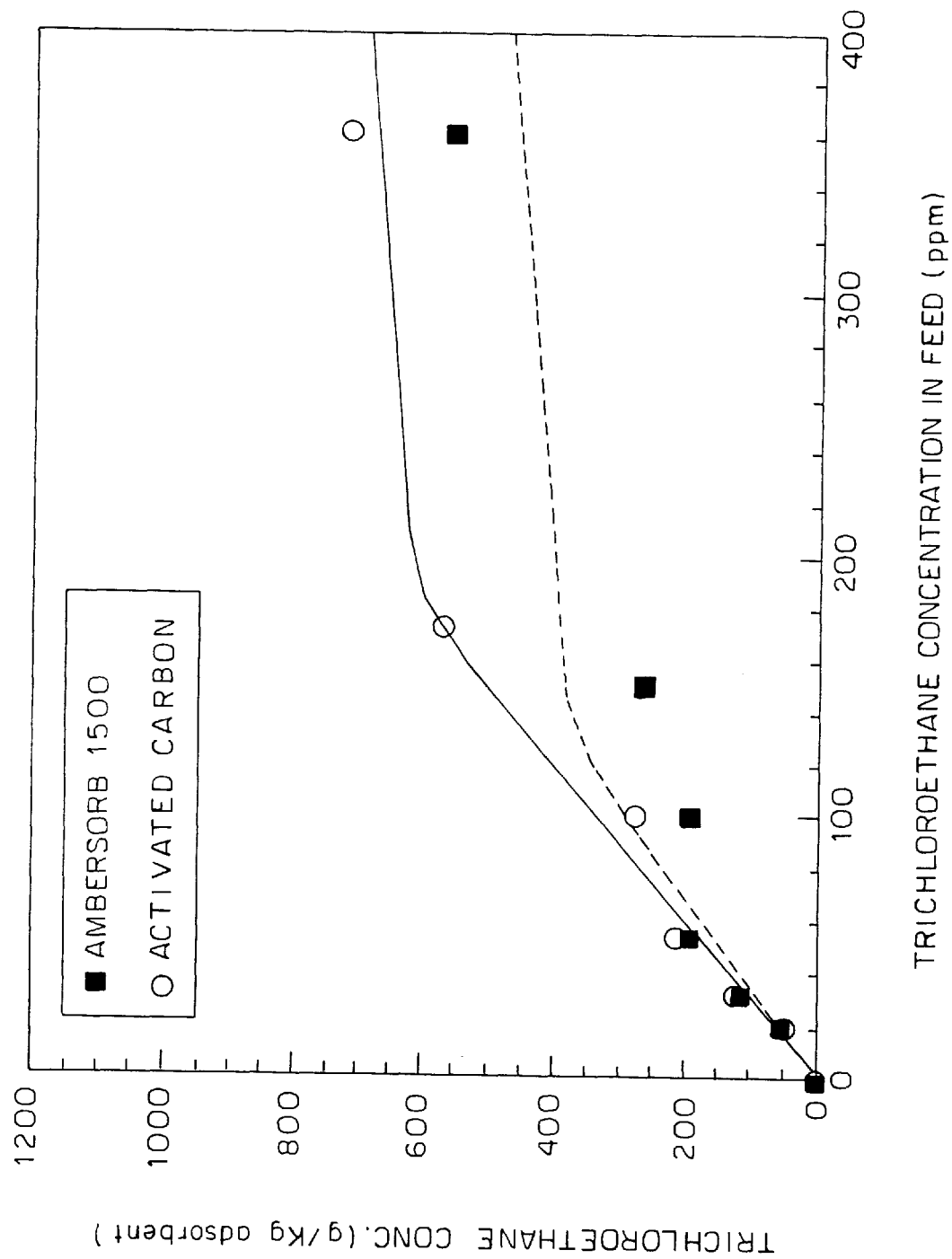
FIG. 7 shows sorption isotherms of trichloroethane from dilute aqueous solution onto adsorbent in filled membranes at 30° C.
Figure 8:
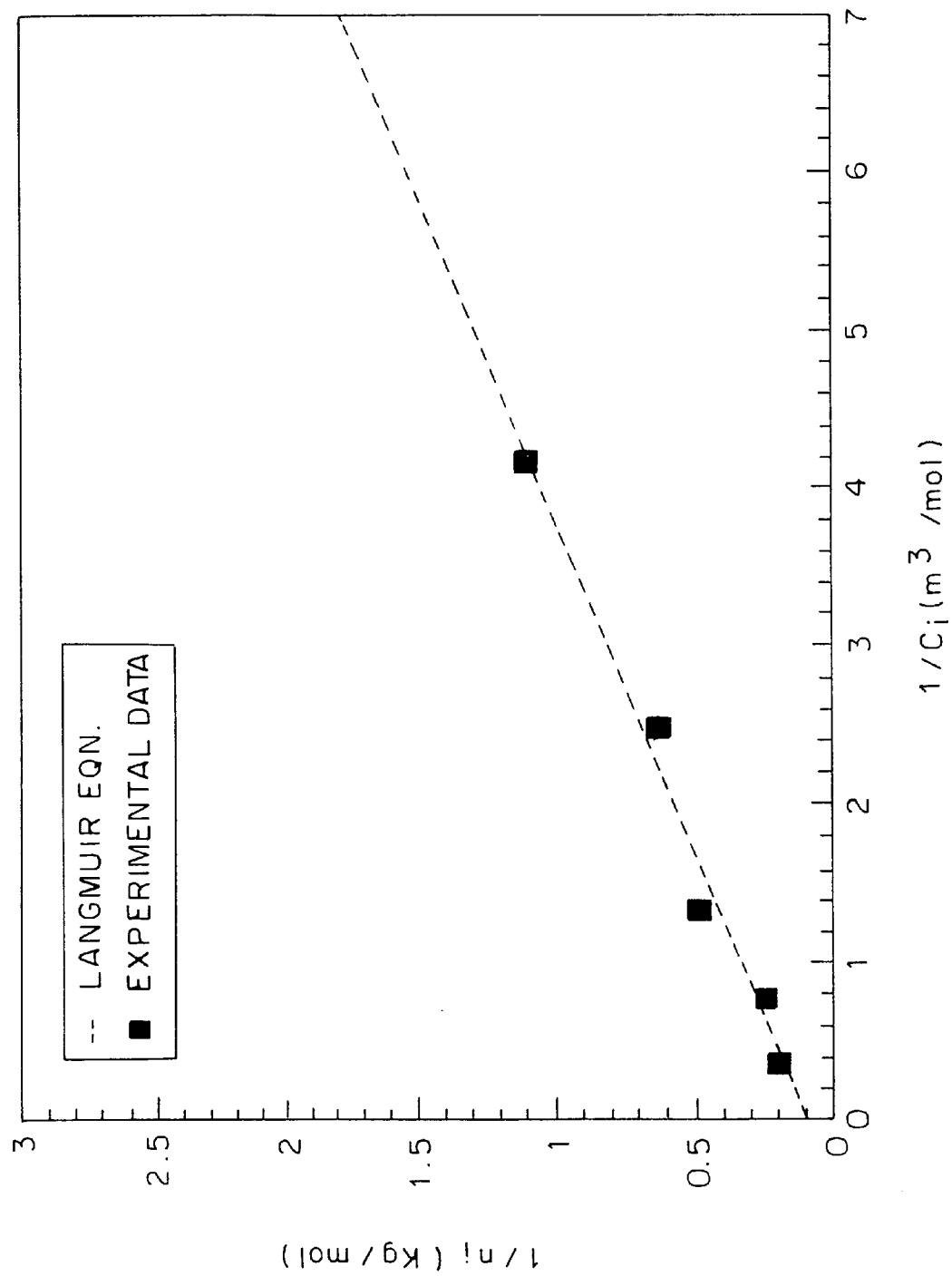
FIG. 8 shows sorption of trichloroethane from dilute aqueous solution onto activated carbon in a filled PEBA membrane at 30° C.
Figure 9:
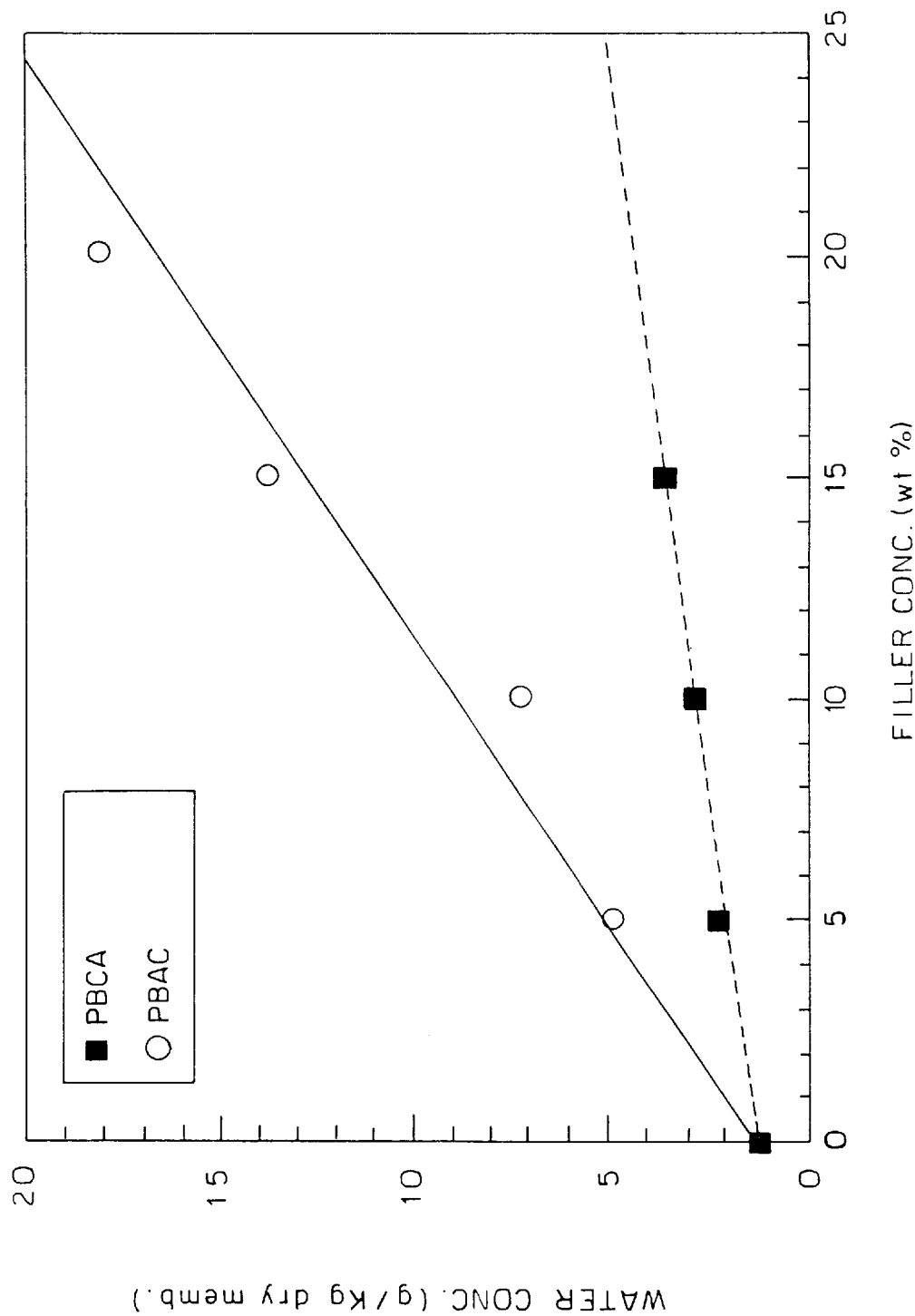
FIG. 9 shows sorption of water into adsorbent-filled pervaporation membranes at 30° C.
Figure 10:
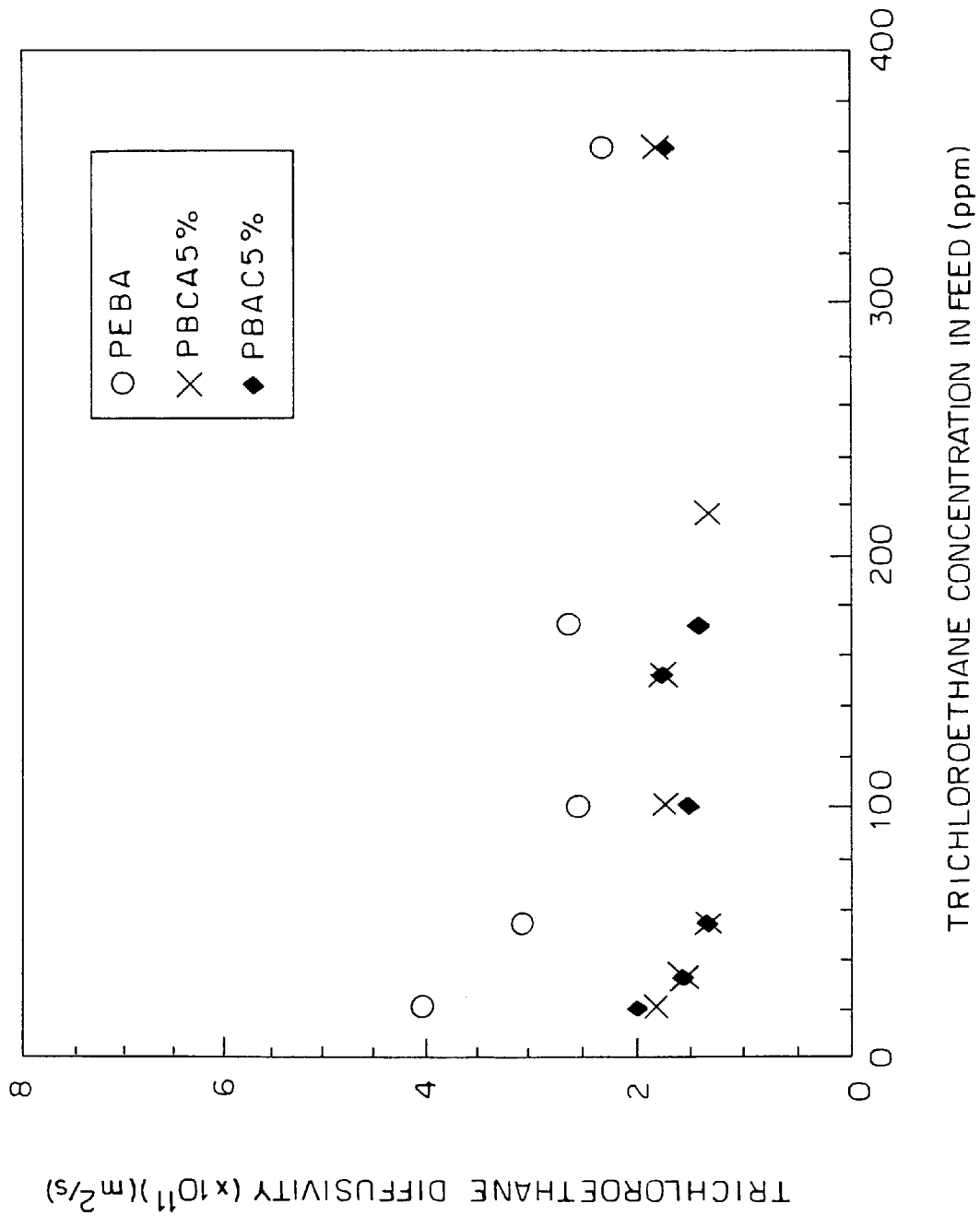
FIG. 10 shows diffusivity of trichloroethane in PEBA and its adsorbent-filled pervaporation membranes at 30° C.
Figure 11:
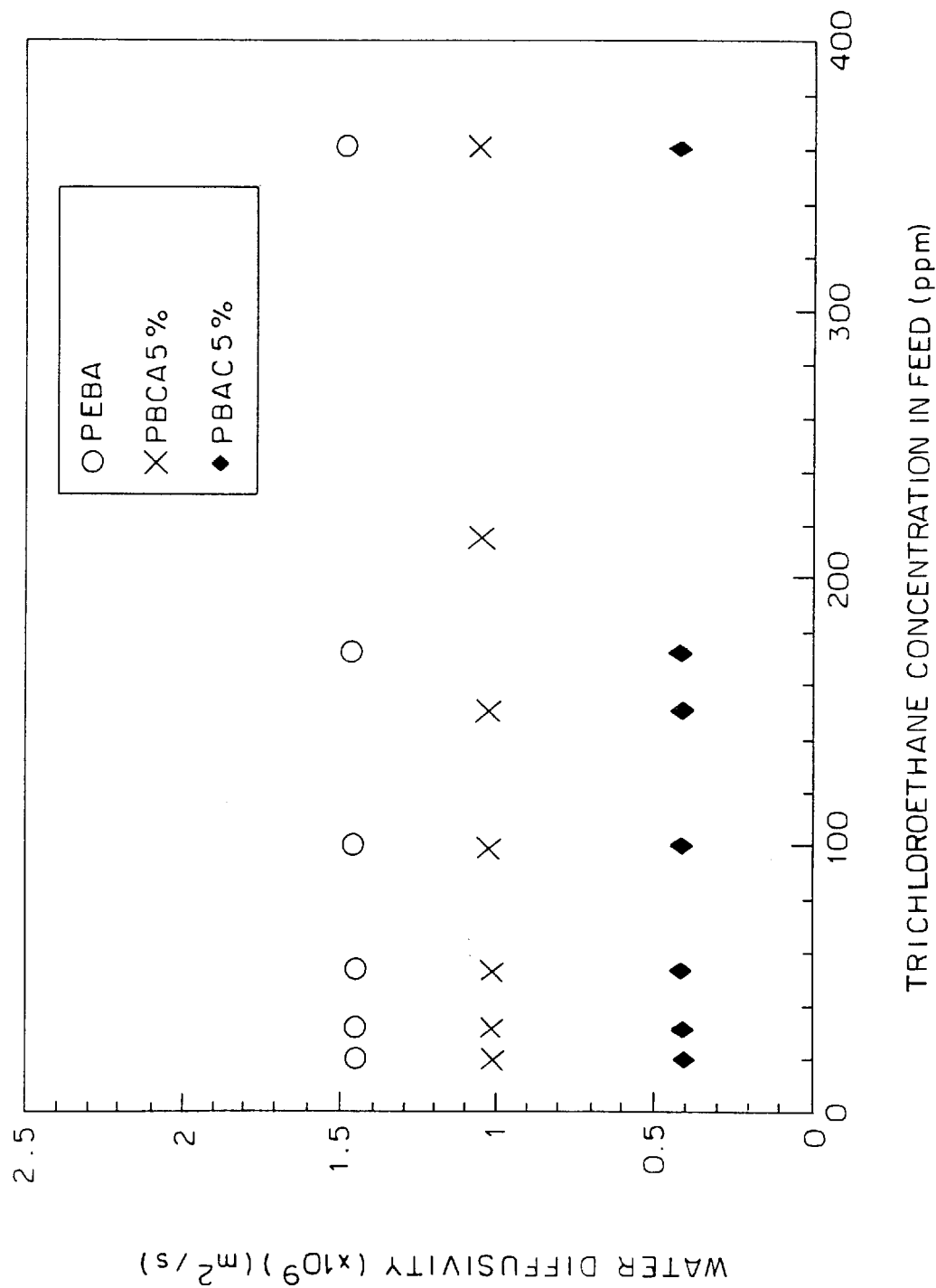
FIG. 11 shows diffusivity of water in PEBA and its adsorbent-filled pervaporation membranes at 30° C.
Figure 12:
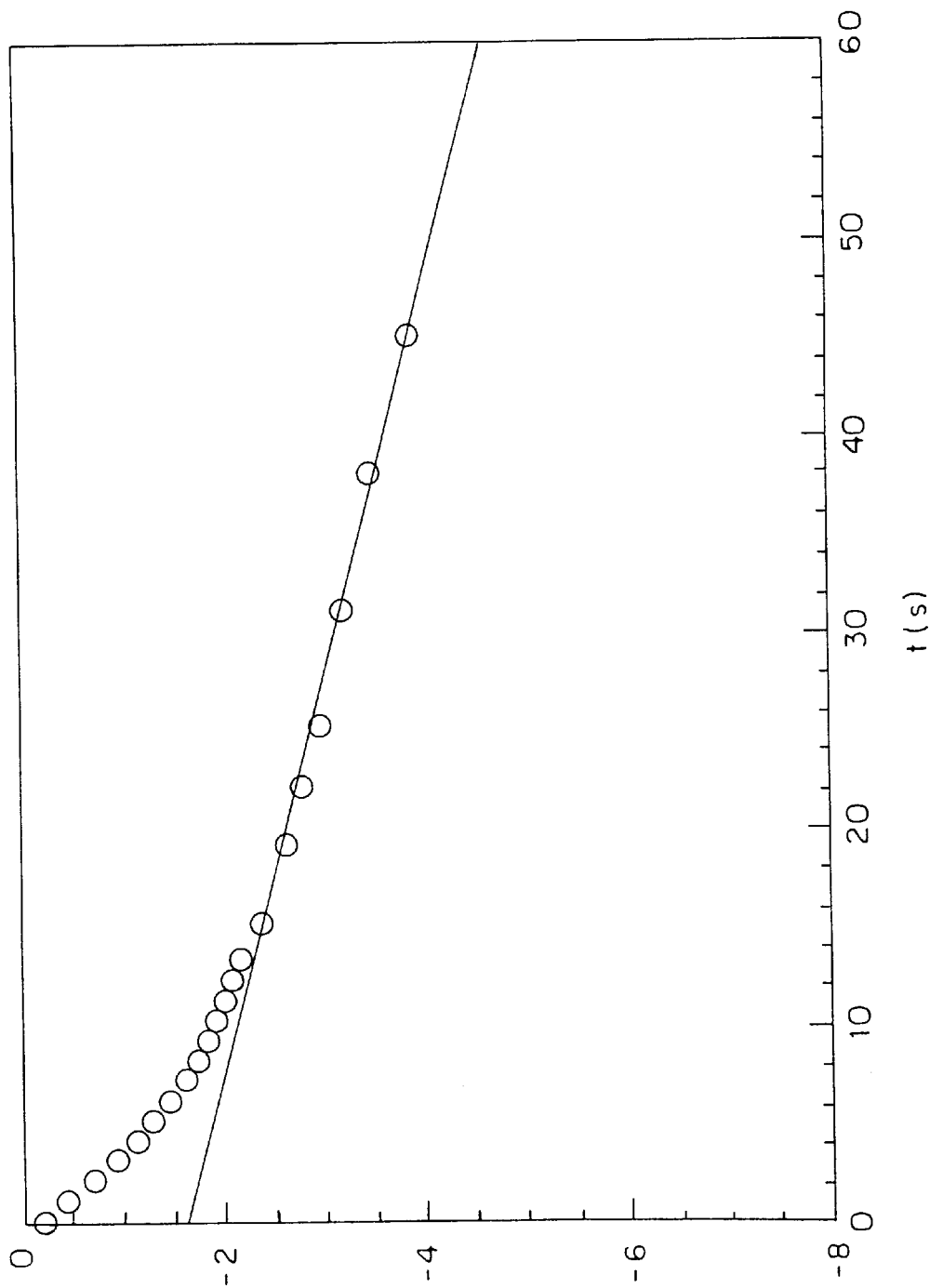
FIG. 12 shows disporting kinetic curves for PBCA 10% water system at 30° C.
Figure 13:
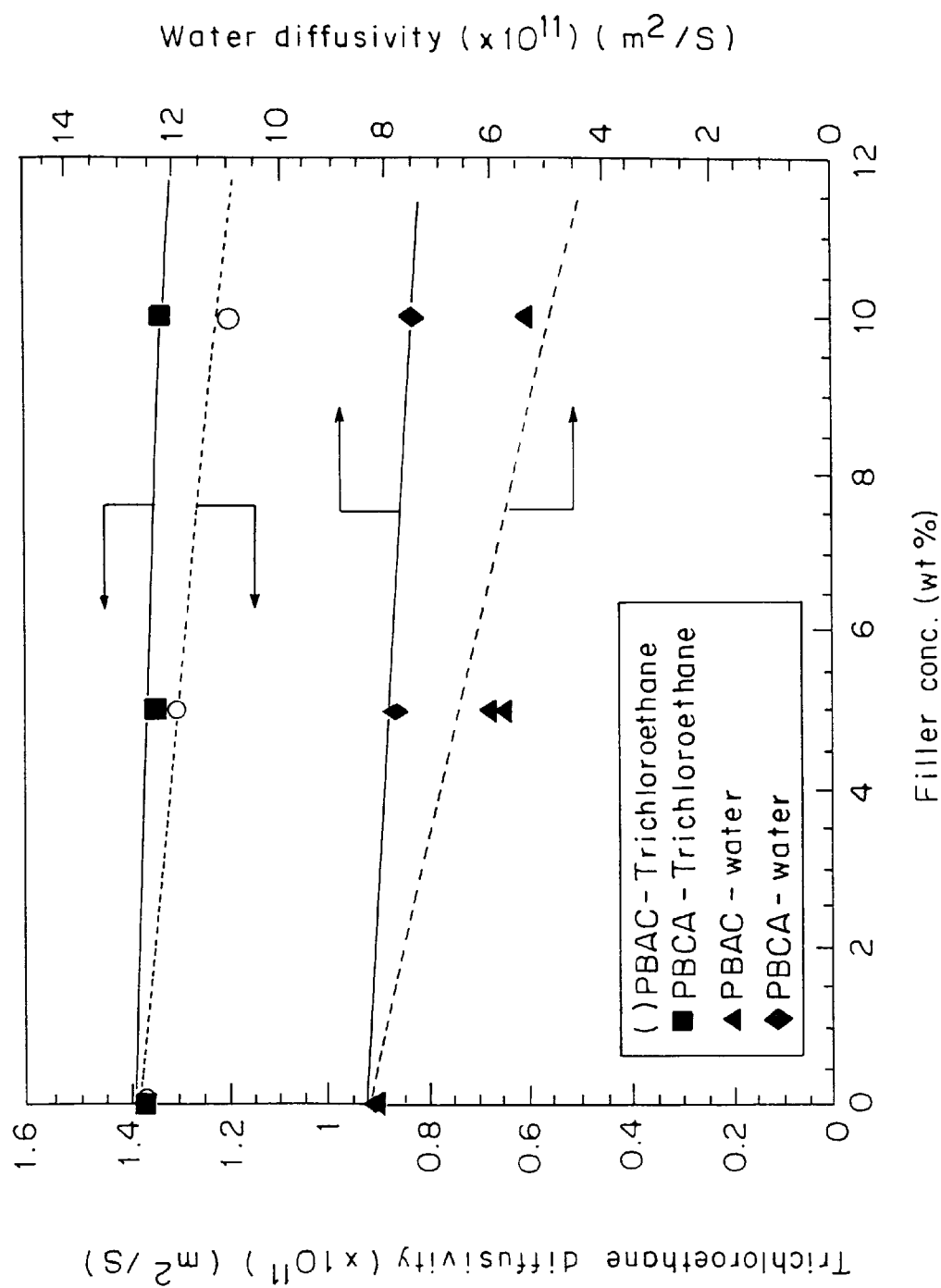
FIG. 13 shows diffusivity of trichloroethane and water in adsorbent-filled pervaporation membranes at zero concentration at 30° C.

As shown in FIGS. 4 and 5, trichloroethane flux increased linearly with feed concentration for PEBA pervaporation membranes filled with both activated carbon WPX and carbonaceous adsorbent Ambersorb 1500. The water fluxes were almost constant. The permeabilities calculated using a resistance-in-series model are listed in Table 2.

TABLE 2

Removal of TCE from Water Using Adsorbent Filled Membranes
(30° C., Feed Flowrate 990 ml/min, Downstream Pressure 0.09 mmHg)

| Membrane | PEBA | PBAC 5% |
|---|---|---|
| $Q_i^m$ (mol-m/m$^2$-s-KPa) | 1.34 × 10$^{-9}$ | 1.82 × 10$^{-9}$ |
| Percent Change of $Q_i^m$ (%) | | 36 |
| $Q_w^m$ (mol-m/m$^2$-s-KPa) | 2.15 × 10$^{-8}$ | 2.57 × 10$^{-8}$ |
| Percent Change of $Q_w^m$ (%) | | 19 |
| Intrinsic Separation Factor | 1742 | 1984 |
| Percent Change of Separation Factor (%) | | 14 |

*PBAC 5%-PEBA membrane filled with 5 wt % activated carbon.
*$Q_i^m$: Intrinsic Organic Permeability
*$Q_w^m$: Intrinsic Water Permeability As can be seen from Table 2, trichloroethane permeability increased as the filler was added to the polymer matrix. The trichloroethane permeability increased 36% and 26%, respectively, for PEBA membranes filled with 5 wt % of activated carbon and Ambersorb 1500. The improvement of trichloroethane permeability increased with the activated carbon loading. However, addition of the adsorbent filler also increased water permeability, 19% for the membrane filled with 5 wt % of activated carbon and 31% for the membrane filled with 5 wt % of Ambersorb 1500. The intrinsic separation factors were calculated from the intrinsic membrane permeabilities of organic compound and water adjusted by the appropriate thermodynamic variables.

The intrinsic separation factor increased for the pervaporation membrane filled with activated carbon. Almost no change occurred in the separation factor for membranes filled with Ambersorb 1500, as shown in Table 2.

EXAMPLE 4

Example 3 was repeated using PBAC10%. As shown in FIGS. 4 and 5, trichloroethane flux increased linearly with feed concentration for PEBA pervaporation membranes filled with both activated carbon WPX and carbonaceous adsorbent Ambersorb 1500. The water fluxes were almost constant. The permeabilities calculated using a resistance-in-series model for this example are listed in Table 3.

TABLE 3

Removal/Recovery of TCE From Water Using Adsorbent Filled Membranes
(30° C., feed flowrate 990 ml/min., downstream pressure 0.09 mmHg)

| Membrane | PEBA | PBAC 10% |
|---|---|---|
| $Q_i^m$ (mol-m/m$^2$-s-KPa) | 1.34 + 10$^{-9}$ | 2.58 × 10$^{-9}$ |
| Percent Change of $Q_i^m$ (%) | | 92 |
| $Q_w^m$ (ml-m/m$^2$-s-Kpa) | 2.15 × 10$^{-8}$ | 2.65 × 10$^{-8}$ |
| Percent Change of $Q_w^m$ (%) | | 23 |
| Intrinsic Separation Factor | 1742 | 2720 |
| Percent Change of Separation Factor (%) | | 56 |

*PBAC 5%-PEBA membrane filled with 5 wt % activated carbon.
*$Q_i^m$: Intrinsic Organic Permeability
*$Q_w^m$: Intrinsic Water Permeability As can be seen from Table 3, trichloroethane permeability increased as the filler was added to the polymer matrix. The improvement of trichloroethane permeability increased with the activated carbon loading.

EXAMPLE 5

Static sorption experiments from both pure liquids and liquid mixtures were performed. A "purge and trap" method was developed to determine the concentration of volatile organic compounds inside the membranes. Traditional methods such as distillation [15–17] and gravimetric [18] methods were difficult to apply to the current systems because of the very small amounts of volatile organic compounds present in membranes (i.e., on the order of 10$^{-3}$ g/g), and these organics are easily lost from aqueous solutions because of their high Henry's law constants. The purge and trap method directly determined the volatile organic compounds sorbed in the membrane by gas chromatography while the quantity of sorbed water was determined by weighing.

Dried membrane samples were submerged in bottles containing pure liquids of aqueous volatile organic compound solutions, which were placed into a water bath maintained at a temperature of 30+0.05° C. Mass uptake was monitored by removing the sample from the bottle, drying with a tissue paper to remove excess solution, and weighing the membrane sample. Equilibrium sorption was determined after a long time of submersion (at least 24 hours) until no further weight increase was observed.

For the liquid mixture, the amount of water in a swollen membrane was calculated from the total mass uptake and the amount of organic determined by the purge and trap method as described below.

Figure 2:
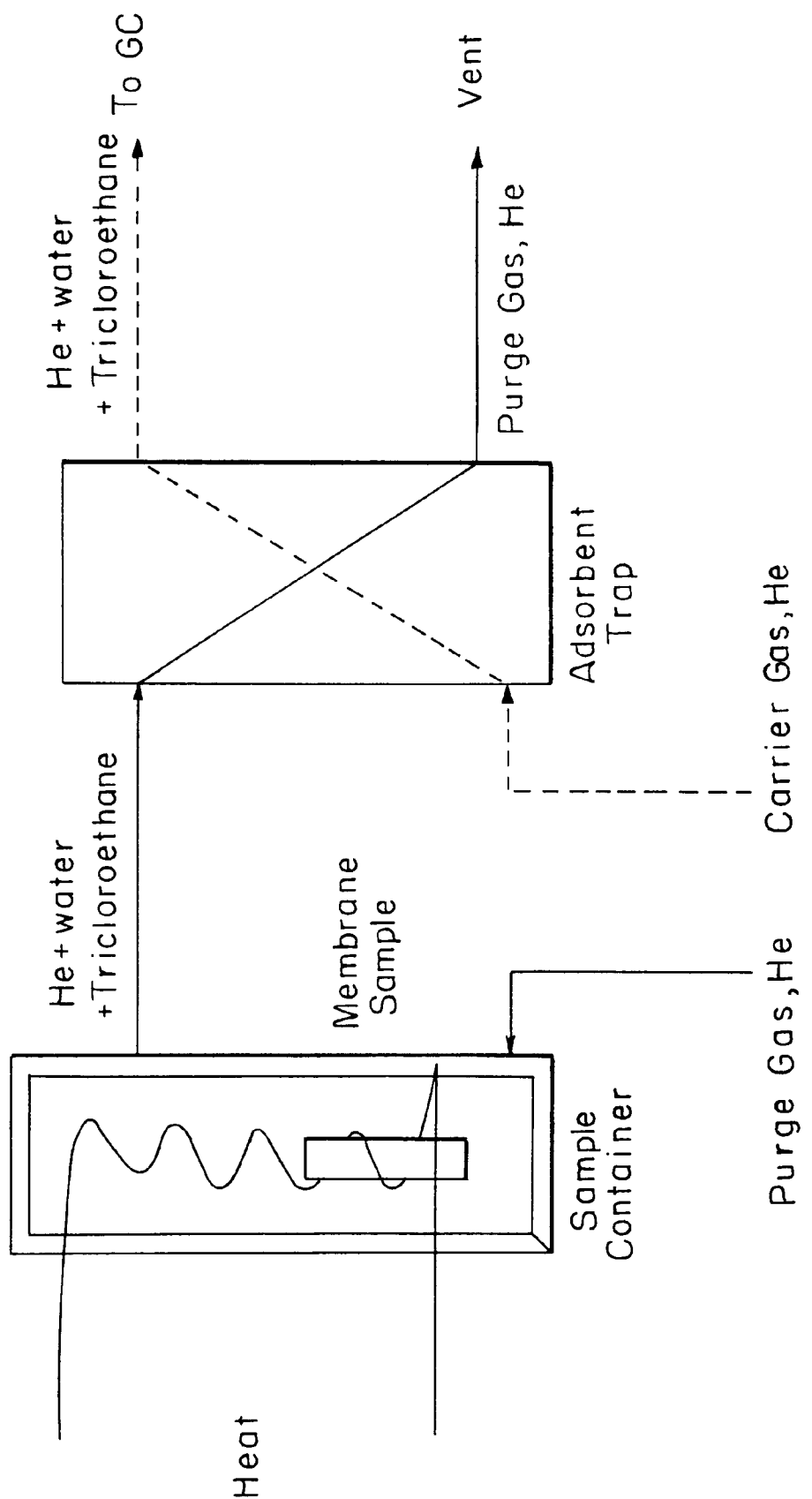
FIG. 2 is a schematic of the purge and trap apparatus to determine the concentration of volatile organic compounds inside the membrane.

FIG. 2 shows the purge and trap apparatus for determining the volatile organic compound sorption in membranes. After equilibration with an aqueous solution of volatile organic compounds, the membrane sample was placed into a sparge tube. Helium was used to remove volatile organic compounds from the sample. The sample was then heated up to 80° C. in order to increase the rate of removal. Volatile organic compounds removed from the membrane sample were collected by an adsorbent trap. The purge trap contained Tenax and silica gel as specified in EPA method 601, which is recommend by EPA for chlorinated hydrocarbon analysis. After collection, the trap was heated to release the volatile organic compounds which were brought by helium flow into the gas chromatograph. The amount of organics sorbed into the membrane was then determined by gas chromatography (Tracor Model 585, Tremetric, TX). The relative error in the gas chromatography analysis for the membrane samples was estimated to be less than 5%. A Mettler microbalance (Mettler Instrument Corporation, Hightstown, N.J.) was used to measure sample mass in the sorption experiments. A typical purge and trap condition is listed in Table 4. The purge time was determined in such a way that no volatile organic compound was detected by gas chromatography after the first run.

TABLE 4

Operating Parameters for the Purge-Trap Method to Determine VOC Concentration Inside Membranes

| Parameters | Values |
|---|---|
| Prepurge Time (min) | 1.0 |
| Preheat Time (min) | 2.5 |
| Purge Flow Rate (ml/min) | 40 |
| Sample Temperature (° C.) | 80 |
| Purge Time (min) | 20 |
| Desorp Preheat Temperature (° C.) | 100 |
| Desorp Temperature (° C.) | 180 |
| Desorp Time (min) | 4 |
| Bake Temperature (° C.) | 225 |
| Bake Time (min) | 7 |

Figure 3:
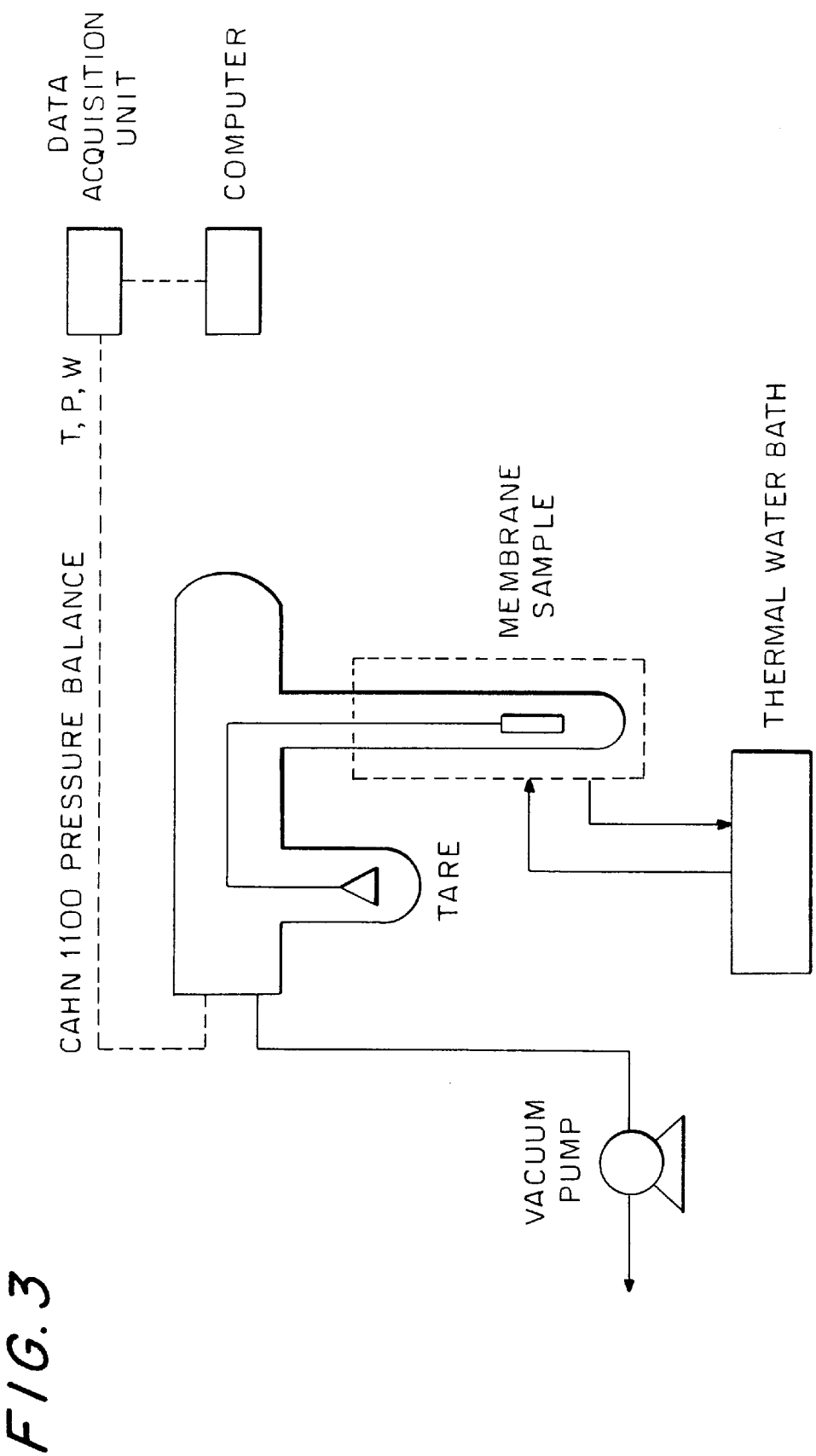
FIG. 3 is a schematic of the desorption apparatus used to determine diffusion coefficient at zero concentration.

FIG. 3 shows the schematic of the gravimetric desorption apparatus. A Cahn 1100 electrobalance was used to monitor the weight change. In order to control the desorption temperature, the hand-down tube was wrapped with a copper coil connected to the constant temperature water bath. After the membrane was equilibrated with the pure liquid and dried by a tissue paper to remove excess liquid, the membrane sample was placed into the pan inside the hang-down tube. The desorption was started by evacuating the system via a vacuum pump. The measured weight change, sample temperature and system pressure were stored in a computer via a data acquisition unit. These data were then used to calculate the diffusivity of volatile organic compounds and water in membranes at zero concentration.

The membranes of the present invention optimize the pervaporation of volatile organic compounds, thus providing an improved method of treating wastewater to remove and/or recover volatile organic compounds therefrom.

Figure 14:
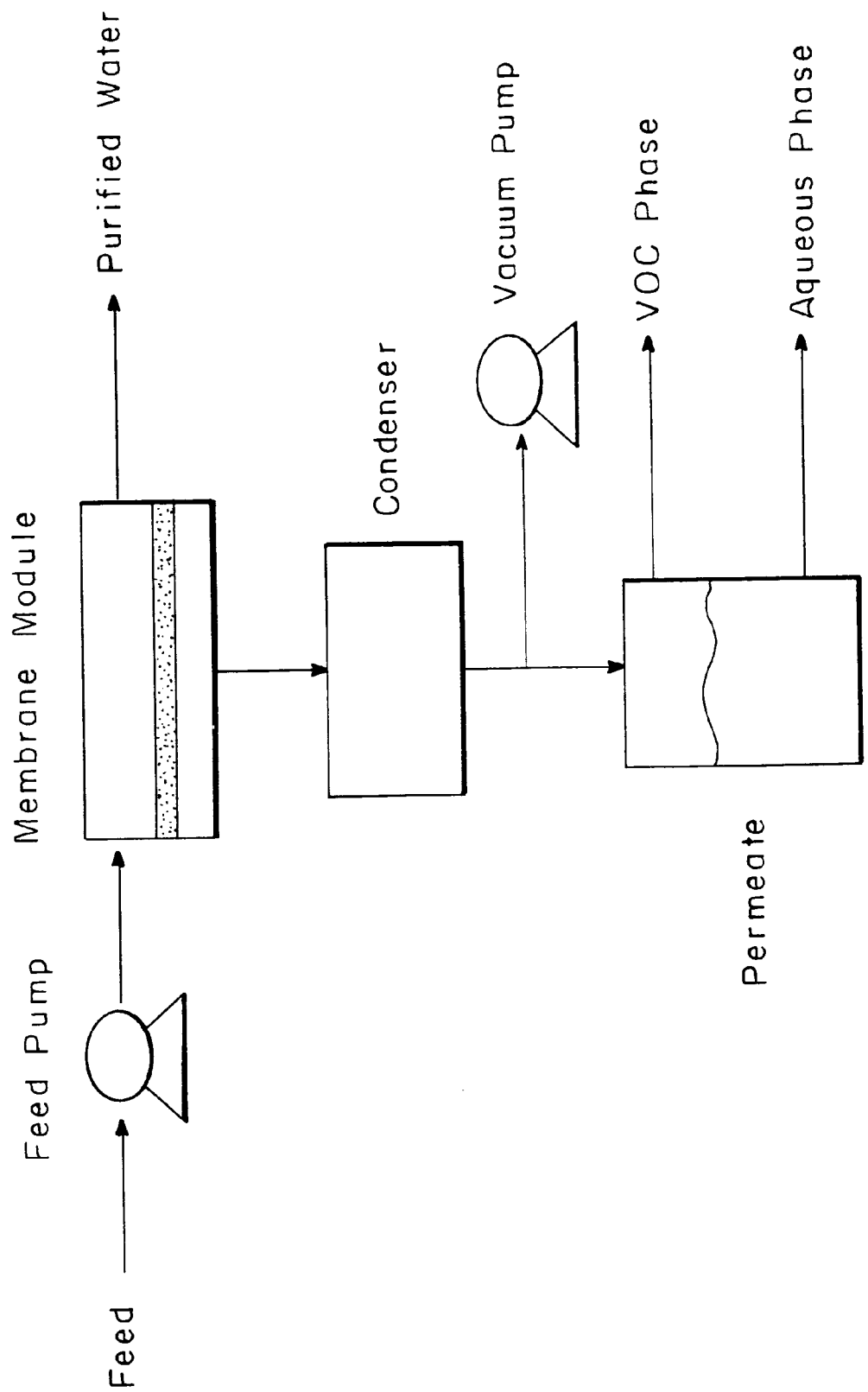
FIG. 14 shows a pervaporation process for removal of volatile organic compounds from water without permeate recycle.
Figure 15:
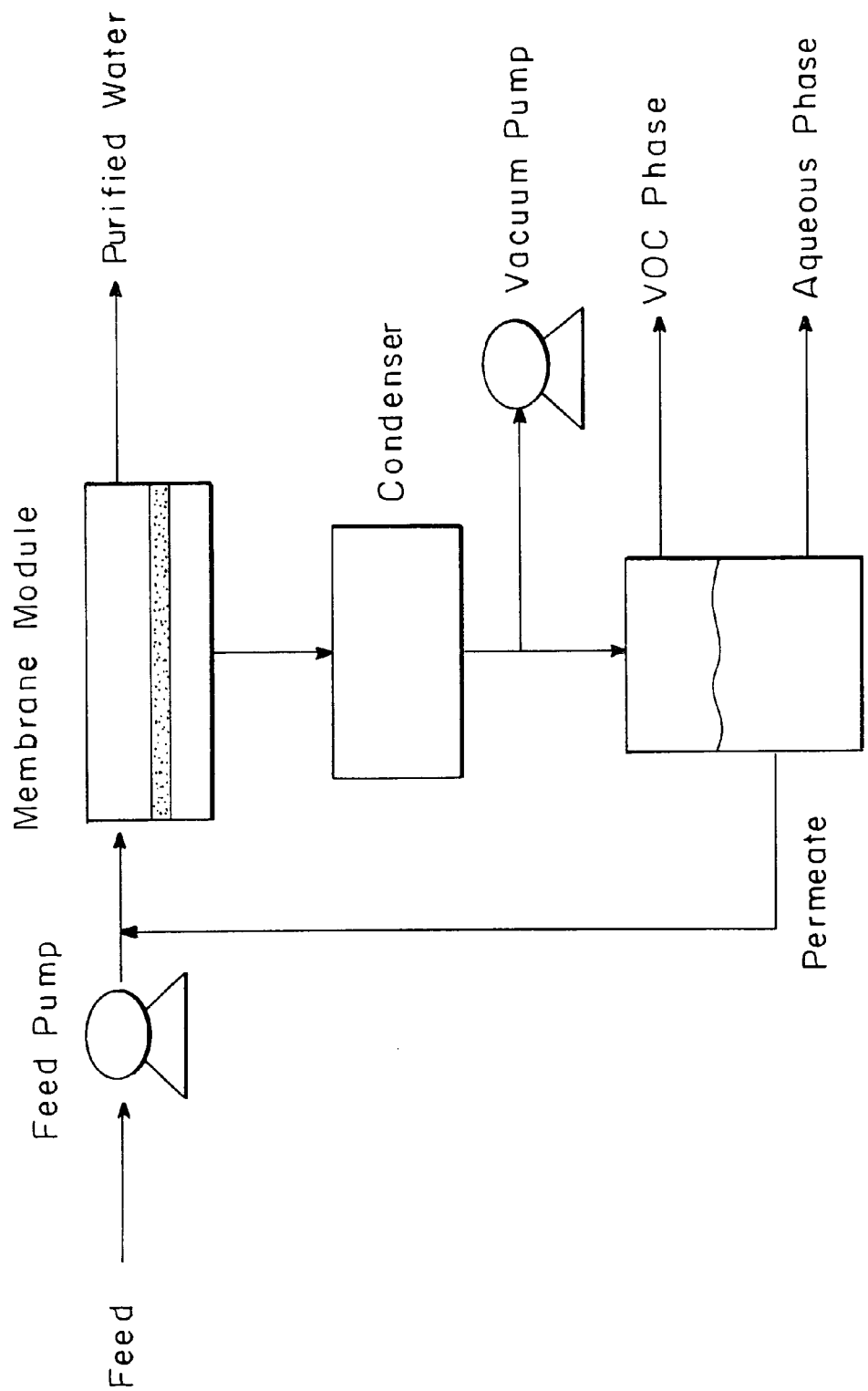
FIG. 15 shows a pervaporation process for removal of volatile organic compounds from water with permeate recycle.

Volatile organic compounds can be removed by pervaporation according to the present invention by using one of two process configurations. The volatile organic compounds can be removed in a single stage without recycle of the permeate, as shown in FIG. 14, and in a single stage with permeate recycle, as shown in FIG. 15.

The permeate is normally two-phase: a volatile organic compound phase and a saturated aqueous phase in equilibrium with the volatile organic compound phase. In the first configuration, shown in FIG. 14, the aqueous permeate is pumped to a post-treatment station. In the second configuration, shown in FIG. 15, the aqueous phase of the permeate is recycled to the feed for repossessing. The choice between these two configurations depends on the following factors: the cost for post-treating the permeate aqueous phase and the value of the recovered solvent. If the post treatment is inexpensive and the recovered solvents are inexpensive, the first configuration may be the preferred configuration, since less membrane area and feed pumping power are required. However, if the post-treatment is expensive or the recovered solvents are valuable, then the second configuration would be better than the first one. Room temperature operation is preferred because of the large volume of wastewater to be treated.

Compared to the conventional technologies for controlling volatile organic compounds, such as activated carbon adsorption, the use of pervaporation for control of volatile organic compounds has the following advantages:

continuous processing, resulting in automatic and uninterrupted operation;

low energy utilization;

simple module design, few moving parts, low maintenance and upkeep;

in-process and off-site recycling;

selective removal of small amounts of pollutants as pure liquid;

effective for a wide concentration range;

recovery of solvent while solving pollution problems;

use of different membranes for different volatile organic compounds;

easy integration with existing processes to form hybrid processes.

only the collected liquid must be evaporated and condensed.

The foregoing description of the specific embodiments will so fully reveal the general nature of the invention that other can, by applying current knowledge, readily modify and/or adapt for various application such specific embodiments without departing from the general concept, and therefore such adaptations and modifications are intended to be comprehended within the meaning and range of equivalents of the disclosed embodiments. It is to be understood that the phraseology or terminology herein is for the purpose of description and not of limitation.

All references cited in this specification are hereby incorporated by reference.

REFERENCES

1. A. C. Larson, "Sizing Environmental Activated Carbon Adsorption Systems", presented at AIChE 1992 annual meeting, Miami Beach, Fla., Nov. 1–6, 1992.
2. E. G. Isacoff, Stephanie M. B. and G. R. Parker, Jr., "The Removal of Regulated Compounds from Groundwater and Wastewater Using Ambersorb 563 Carbonaceous Adsorbent", presented at AIChE 1992 annual meeting, Miami Beach, Fla., Nov. 1–6, 1992.
3. G. R. Parker Jr. and Stephanie M. Bortko, "Groundwater Remediation Using Ambersorb Adsorbents", presented at the Florida Environmental Chemistry Conference, Oct. 30–Nov. 1, 1991.
4. W. Ji, S. K. Sikdar and S.-T. Hwang, "Modeling of Multicomponent Pervaporation for Removal of Volatile Organic Compounds from Water", J. Membrane Sci., 93 (1994) 1–19.
5. H. J. C. Te Hennepe, D. Bargeman, M. H. V. Mulder and C. A. Smolders, "Zeolite-Filled Silicone Rubber Membranes", J. Membrane Sci., 35 (1987) 39.
6. M. Goldman, D. Frankel and G. Levin, "A Zeolite/Polymer Membrane for the Separation of Ethanol Water Azeotrope", J. Appl. Polymer. Sci., 37 (1989) 1791.
7. M. Jia, K.-V. Peinemann and R.-D.Behling, "Molecular Sieving Effect of the Zeolite-Filled Silicone Rubber Membranes in Gas Permeation", J. Membrane Sci., 57 (1991) 289–296.
8. J. M. Duval, B. Folkers, M. H. V. Mulder, G. Desgrandchamps and C. A. Smolders, "Adsorbent Filled Membranes for Gas Separation. Part 1. Improvement of Gas Separation Properties of Polymeric Membranes by Incorporation of Microporous Adsorbents", J. Membrane Sci., 80 (1993) 189–198.
9. H. J. C. Te Hennepe, C. A. Smolders, D. Bargeman and M. H. V. Mulder, "Exclusion and Tortuosity Effects for Alcohol/Water Separation by Zeolite-Filled PDMS Membranes", Sep. Sci. Tech., 26 (4) (1991) 585–596.

10. L. Cussler, "Membranes Containing Selective Flakes", *J. Membrane Sci.,* 52 (1990) 275–288.
11. J. Crank and G. S. Park, *Diffusion in Polymers,* Academic Press, New York (1968).
12. Rohm and Hass Company, "Ambersorb Carbonaceous Adsorbents", Technical Notes, 1992.
13. K. W. Boddeker and G. Bengtson, "Pervaporation of Low Volatility Aromatics from Water", *J. Membrane Sci.,* 53 (1990) 143.
14. B. Raghunath and S.-T. Hwang, "Effect of Boundary Layer Mass Transfer Resistance in the Pervaporation of Dilute Organics", *J. Membrane Sci.,* 65 (1992a) 147.
15. M. H. V. Mulder, T. Franken and C. A. Smolders, "Preferential Sorption Versus Preferential Permeability in Pervaporation", *J. Membrane Sci.,* 22 (1985) 155–173.
16. H. H. Nijhuis, *Removal of Trace Organics form Water by Pervaporation (A Technical and Economic Analysis)*, Ph.D. Thesis, University of Twente, Enschede, The Netherlands (1990).
17. B. K. Dutta and S. K. Sikdar, "Separation of Azeotropic Organic Liquid Mixtures by Pervaporation", *AIChE J.,* 37 (4) (1991) 581–588.
18. J. P. Brun, C. Larchet, R. Merlet and G. Bulvestre, "Sorption and Pervaporation of Dilute Aqueous Solutions of Organic Compounds Through Polymer Membranes", *J. Membrane Sci.,* 23 (1985) 257.
19. G. J. Van Amerongen, *Rubber Chem Tech.,* 37, (1964) 1065.
20. M. M. Dubinin, "Porous Structure and Adsorption Properties of Active Carbons" in *Chemistry and Physics of Carbon,* P. J. Walker, Ed., Vol. 2, Dekkeer, New York, 1965, p.51.
21. Y. Sudo, D. M. Mist and M. Suzuki, "Concentration Dependence of Effective Surface Diffusion Coefficients in Aqueous Phase Adsorption on Activated Carbon", *Chem. Eng. Sci.,* 33 (1978) 1287.
22. M. Suzuki and T. Fujii, "Concentration Dependence of Surface Diffusion Coefficient of Propionic Acid in Activated Carbon Particles", *AIChE J.,* 28 (3) (1982) 380.
23. M. Muraki, Y. Iwashima and T. Hayakawa, "Rate of Liquid-Phase Adsorption on Activated Carbon in the Stirred Tank", *J. Chem. Eng. Japan,* 15 (1) (1982) 34.
24. A. Siedel and P. S. Carl, *Chem. Eng. Sci.,* 44 (1989) 189.
25. P. J. Flory, *J. Chem. Phys.,* 9 (1941) 660.
26. M. L. Huggins, *J. Chem. Phys.,* 9 (1941) 440.
27. M. Suzuki and K. Kawazoe, "Effective Surface Diffusion Coefficients of Volatile Organics on Activated Carbon During Adsorption from Aqueous Solution, *J. Chem. Eng. Japan,* 7 (1974) 346.

What is claimed is:

1. A pervaporation membrane for pervaporation of volatile organic compounds from contaminated water comprising a nonporous membrane filled with at least one hydrophobic adsorbent which preferentially adsorbs the volatile organic compounds to be removed from the contaminated water, wherein said hydrophobic adsorbent is selected from the group consisting of hydrophobic adsorbents which haqe a surface area of at least 900 $m^2/g$.

2. The pervaporation membrane according to claim 1 wherein the hydrophobic adsorbent is present in an amount ranging from about 1 wt % to about 25 wt % of the total membrane.

3. The pervaporation membrane according to claim 1 wherein the polymeric membrane is made of a rubbery polymer selected from the group consisting of polydimethyl siloxanes, poly(1-trimethylsilyl-1-propyne), polyurethanes, polybutadiene, polyether-block-polyamides, silicon polycarbonates, styrene butadiene rubber, nitrile butadiene rubber, ethene-propene terpolymer.

4. The pervaporation membrane according to claim 1 wherein the hydrophobic adsorbent is selected from the group consisting of hydrophobic zeolites, hydrophobic molecular sieves, activated carbon, hydrophobic polymer resin adsorbents, and mixtures therof.

5. A method for removing volatile organic compounds from contaminated wastewater containing volatile organic compounds comprising feeding contaminated wastewater to a pervaporation membrane according to claim 1 and removing volatile organic compound which have permeated across the pervaporation membrane.

6. The method according to claim 5 wherein after the contaminated wastewater has been fed across the pervaporation membrane, the aqueous phase of the permeate is pumped to a post-treatment station.

7. The method according to claim 5 wherein, after the contaminated wastewater has been fed across the pervaporation membrane, the aqueous phase of the permeate is recycled to the feed for repossessing.

8. The method according to claim 5 wherein, after the contaminated wastewater has been fed across the pervaporation membrane, the volatile organic compounds are recovered from the pervaporation membrane.

* * * * *